US006253905B1

(12) United States Patent
Pelka

(10) Patent No.: US 6,253,905 B1
(45) Date of Patent: Jul. 3, 2001

(54) UNSCRAMBLING AND ALIGNING CONVEYOR

(75) Inventor: Ronald E. Pelka, Grand Rapids, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/258,380

(22) Filed: Feb. 26, 1999

(51) Int. Cl.[7] .................................................. B65G 47/26
(52) U.S. Cl. ......................... 198/456; 198/415; 198/454
(58) Field of Search .................................. 198/456, 415, 198/453, 454, 460.1

(56) References Cited

U.S. PATENT DOCUMENTS

| 2,848,096 | 8/1958 | Luginbühl . |
| 3,176,821 | 4/1965 | Eldred et al. ........................ 198/20 |
| 3,224,554 | 12/1965 | Moulder et al. . |
| 3,232,411 | 2/1966 | Kulig ..................................... 198/30 |
| 3,604,551 | 9/1971 | Fink . |
| 4,037,710 | 7/1977 | Brutcher .............................. 198/443 |
| 4,039,074 | 8/1977 | Maxted ................................ 198/456 |
| 4,044,897 | 8/1977 | Maxted ............................... 214/11 R |
| 4,056,180 | 11/1977 | Gunti . |
| 4,111,412 | 9/1978 | Cathers ............................... 271/251 |
| 4,252,232 | 2/1981 | Beck et al. ........................... 198/443 |
| 4,284,186 | 8/1981 | Brouwer .............................. 198/415 |
| 4,693,356 | 9/1987 | Pi-May . |
| 4,889,224 | 12/1989 | Denker . |
| 5,147,023 | 9/1992 | Meindl . |

(List continued on next page.)

FOREIGN PATENT DOCUMENTS

| 2049627 | 4/1971 | (DE) . |
| 4134735 | 4/1993 | (DE) . |
| 04324536A1 | 1/1995 | (DE) . |
| 0414210A1 | 2/1991 | (EP) . |
| 2013637A | 8/1979 | (GB) . |
| 2256444A | 12/1992 | (GB) . |
| 04144812A | 5/1992 | (JP) . |
| WO8101281 | 5/1981 | (WO) . |

OTHER PUBLICATIONS

Commonly assigned co–pending United States patent application Ser. No. 09/313,153 filed on May 17, 1999, entitled Compact Article Singulation Conveyor.
Commonly assigned co–pending United States patent application Ser. No. 09/131,817, filed on Aug. 10, 1998, entitled Compact Article Unscrambler.
Commonly assigned co–pending application Ser. No. 08/616,685 filed Mar. 15, 1996, by Dennis J. Schuitema and Ronald J. DeVree.
Commonly assigned co–pending application Ser. No. 09/131,817 filed Aug. 10, 1998, by Dennis J. Schuitema, Ronald J. DeVree and Curtis E. LeMay.

*Primary Examiner*—Christopher P. Ellis
*Assistant Examiner*—Joe Dillon, Jr.
(74) *Attorney, Agent, or Firm*—Van Dyke, Gardner, Linn & Burkhart, LLP

(57) ABSTRACT

An unscrambling and aligning conveyor comprises a plurality of tapered rollers attached to a pair of side supports. The tapered rollers are driven at a single speed and tapered to a minimum diameter to define an alignment region. The tapered rollers create a lateral speed decrease toward the alignment region of the conveyor, causing separation and rotation of the articles, and thereby enabling the articles to be singulated in the alignment region. The tapered rollers are supported by the side supports such that center axis of each roller is horizontal to thereby defining a downwardly sloping article transport surface which increases movement of the articles towards the alignment region. The unscrambling and aligning conveyor is driven at a speed greater than the input conveyor located adjacently upstream thereof to provide articles with a gap therebetween so that articles moving along the unscrambling and aligning conveyor are properly singulated.

31 Claims, 5 Drawing Sheets

U.S. PATENT DOCUMENTS

| | | |
|---|---|---|
| 5,211,281 | 5/1993 | Almes . |
| 5,222,586 | 6/1993 | Ydoate et al. ........................ 198/452 |
| 5,240,101 | 8/1993 | LeMay et al. ........................ 198/443 |
| 5,301,791 | 4/1994 | Shampine . |
| 5,372,238 | 12/1994 | Bonnet ................................ 198/455 |
| 5,400,896 | 3/1995 | Loomer ................................ 198/415 |
| 5,415,281 | 5/1995 | Taylor et al. ........................ 198/448 |
| 5,531,311 | 7/1996 | LeMay et al. . |
| 5,701,989 | 12/1997 | Boone et al. ........................ 198/448 |
| 5,738,202 | 4/1998 | Ydoate et al. . |
| 5,769,204 | 6/1998 | Okada et al. ........................ 198/443 |
| 5,918,723 | 7/1999 | Schuitema et al. . |

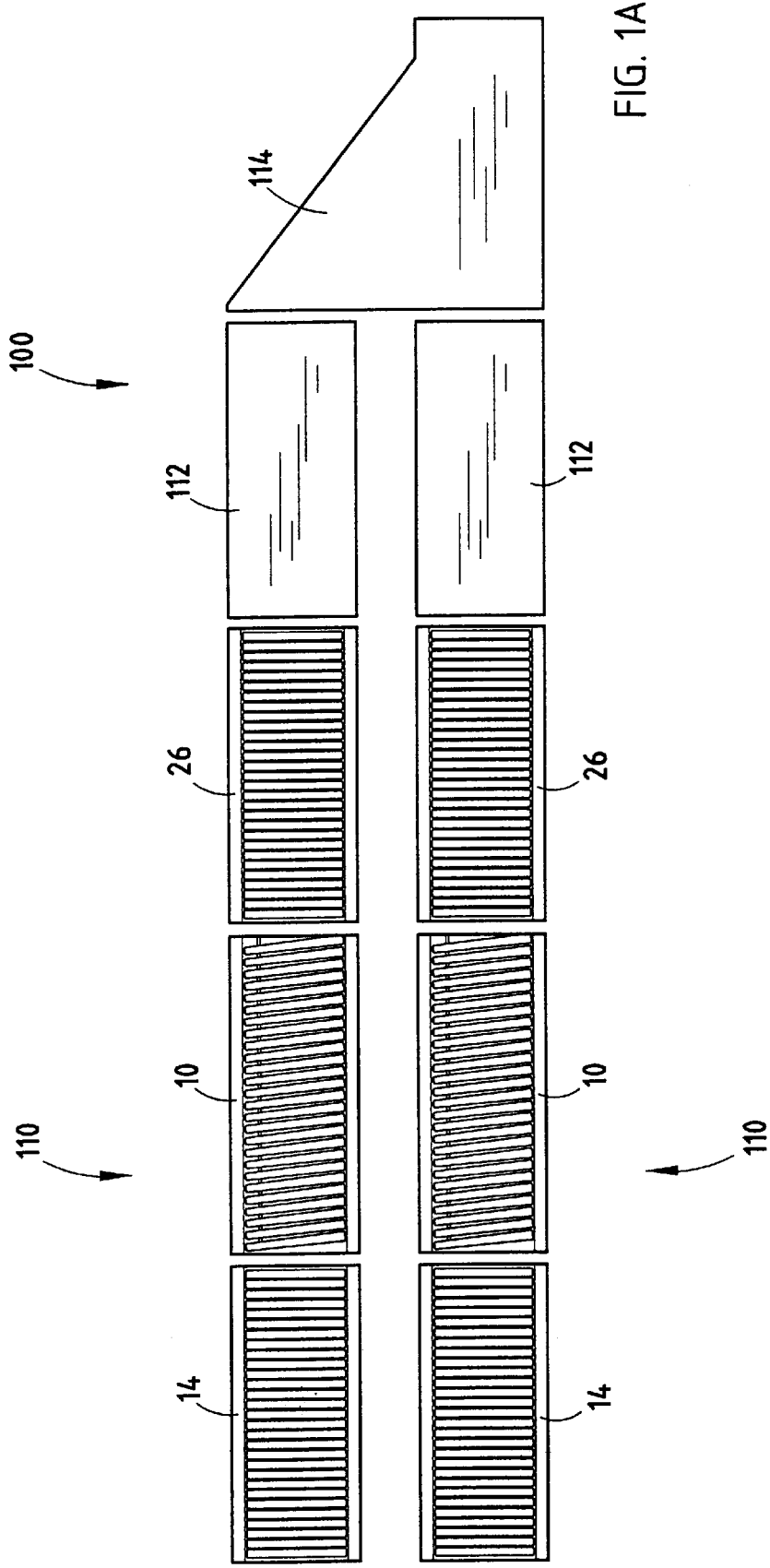

UNSCRAMBLING AND ALIGNING CONVEYOR

BACKGROUND OF THE INVENTION

This invention relates generally to conveyor systems and, in particular to conveyors used to unscramble articles received in random order and orient and align the articles in a single file. The invention is particularly adapted for use upstream of an induction system but may have other applications.

Many conveyor operations, especially those used in article distribution centers, receive a variety of articles varying in weight, height, length and depth. These articles are unloaded from trucks en masse and placed on the conveyor system. Once upon the conveyor, the articles are forwarded to a central area in random order and orientation. At this point in the conveyor operation, it becomes necessary to orient and align the articles in a single file for further processing. Normally, such further processing includes scanning a barcode attached to the surface of each article. This barcode contains information which identifies the destination of the article. After scanning the articles, they are sorted using a sortation conveyor to discrete departure destination areas. Once in a particular departure destination, the articles are loaded into a truck or other form of transportation and shipped to their final destination. Failure to properly unscramble and singulate articles prior to reaching the scanner results in shipment of articles to an incorrect destination and reduces the efficiency of the distribution process.

Unscrambling and aligning conveyors normally utilize skewed rollers which transport articles longitudinally and laterally toward one side of the conveyor. Often, such systems utilize a discrete number of "zones" which are driven at progressively faster speeds in order to unscramble and align the articles. Each zone of the unscrambling and aligning conveyor is driven by a separate motor and dedicated drive mechanism. Consequently, such unscrambling and aligning conveyors are often expensive and are susceptible to failure due to the number of different motors and drive systems necessary to operate the unit. Thus, these conveyors require frequent maintenance, which in turn increase the costs associated with the distribution process.

Furthermore, existing unscrambling and aligning conveyors do not effectively eliminate the occurrence of "side-by-side" articles. "Side-by-side" articles, as they are referred to in the industry, are two or more articles which are positioned laterally adjacent along the unscrambling and aligning conveyor and remain so when transferred to the discharge end. The existence of "side-by-sides" interferes with the scanning procedure, insofar as the scanner is incapable of scanning more than one package simultaneously. If such "side-by-sides" are detected, they are manually removed from the conveyor system and placed in a recirculation line, thereby decreasing the throughput of the conveyor system as a whole. If undetected, one of the articles, specifically, the one which is not detected by the scanner, is often sorted along with the adjacent article and subsequently shipped to an incorrect destination. Furthermore, "side-by-sides" often generate jams during the sortation procedure, and thereby reduces the throughput, or articles sorted per unit time, of the distribution center.

Additionally, existing conveyors systems often undergo updating to generate a higher throughput. For example, an existing conveyor system may have the sortation system replaced in order to utilize new technology and thereby increase the efficiency of the system as a whole. Consequently, it often becomes necessary to replace an existing unscrambling and aligning conveyor with one having the ability to handle a larger volume of parcels at a higher speed. Heretofore, replacement of the unscrambling and aligning conveyor has presented problems for the industry. Normally, replacing an unscrambling and aligning conveyor required the same to be torn out and replaced with the updated conveyor. This is a great expense in terms of both cost and downtime.

Also, it is relatively common to add an unscrambling and aligning conveyor to an existing conveyor system. For example, it may be desirable to add an unscrambler upstream of an induction system in order to significantly reduce the number of side-by-side articles fed to the induction system. Such side-by-side articles tend to interfere with proper operation of the induction system and have previously required an operator to manually remove such packages. In such instances, a length of conveyor must be torn out and replaced with an unscrambling and aligning conveyor. The procedure of adding an unscrambling and aligning conveyor may also be costly, resulting in a large amount of downtime as the existing conveyor section must be completely torn out and the unscrambling and aligning conveyor installed.

Consequently, there exists a need for an unscrambling and aligning conveyor which can effectively singulate a large volume of packages delivered thereto in a close packed order at a rate which is commensurate with the existing high speed conveyor equipment, and can be retrofitted onto an existing conveyor system with a minimal amount of labor and changeover costs.

SUMMARY OF THE INVENTION

Accordingly, the present invention advances an unscrambling and aligning conveyor having an input end which receives articles from an input conveyor in random order and alignment, and an opposing discharge end from which singulated, unscrambled articles are discharged. The unscrambling and aligning conveyor has an article transport surface, supported by a first and second side support, which is configured to transport articles longitudinally from the input end to the discharge end. According to an aspect of the invention, the article transport surface produces a linear speed decrease towards an alignment region of the conveyor in order to cause articles positioned laterally remote from the alignment region to accelerate in front of articles positioned proximate to the alignment region.

In one particular form, the linear speed decrease is provided by a plurality of tapered rollers supported by the side supports. Each tapered roller decreases in diameter toward the alignment region. The tapered rollers are preferably skewed with respect to the first and second side supports to thereby urge articles towards the alignment region. Also, preferably, the tapered rollers are parallel, while each tapered roller rotates upon a substantially horizontal axis of rotation to thereby create a slightly declining, or downwardly sloped article transport surface which in turn provides a gravitational force to move articles towards the alignment region.

According to another aspect of the invention, when articles contact the input end of the unscrambling and aligning conveyor, a separation distance or gap is generated between a particular article and the preceding article. These gaps between articles provide the space necessary for an article to move ahead of a laterally adjacent article and thereby facilitates article alignment and singulation. This may be accomplished by the input conveyor being driven at a speed less than the speed of the unscrambling and aligning conveyor.

According to another aspect of the invention, the plurality of tapered rollers are driven at a single speed by a power mechanism in operational connection with drive equipment such as an endless padded conveyor chain, belt or the like. Powering the unscrambling and aligning conveyor using one power source reduces the energy costs associated with its operation and simplifies the installation and maintenance of the conveyor.

The present invention also provides a method for controlling a conveyor system. The method comprises monitoring the movement of articles, preferably by photo-detectors, on the accumulation conveyor which receives singulated articles from the unscrambling and aligning conveyor. When the photo-detectors detect the lack of movement of articles along the accumulation conveyor for a predetermined period of time, a signal is issued to a controller in electrical communication with the power mechanism of the unscrambling and aligning conveyor. Upon receipt of this signal, the controller deactivates or decelerates the unscrambling and aligning conveyor. Preferably, the controller is also in electrical communication with the input conveyor and thereby either shuts down or reduces the speed of the input conveyor upon receipt of the signal from the photo-detectors. Shutting down or decelerating the unscrambling and aligning conveyor as well as all conveyors upstream thereof prevents the unscrambling and aligning conveyor from becoming blocked by articles encroaching upon the discharge end.

The present invention also provides a method for retrofitting an unscrambling and aligning conveyor and transforming a length of conveyor into an unscrambling and aligning conveyor. The method includes removing the existing article transport surface and replacing the same with the tapered rollers. An unscrambling and aligning conveyor, or a length of a conveyor, normally includes a pair of side supports generally arranged parallel and spaced a preselected distance apart. The side supports contain a plurality of sets of apertures, wherein an aperture on the first side support is axially aligned with an aperture on the second side support. Subsequent to removal of the existing article transport surface, the tapered rollers of the present invention may be positioned within the apertures of the side supports such that each tapered roller occupies an aperture in one side support and is received on the opposing side support by an aperture which is not axially aligned with the opposing aperture. Insertion of the tapered rollers of the present invention in this manner provides a skew, with respect to the first and second side support, which urges articles toward one side. Once the tapered rollers of the present invention are installed, a vertical guide surface is positioned proximate to the alignment region of the tapered rollers. The vertical guide surface prevents articles from being propelled laterally from the article transport surface and facilitates the forward progression of articles.

The present invention also provides a conveyor system having at least one induction line which receives articles in single file from an unscrambling conveyor. Preferably, an accumulation conveyor is positioned between the induction line and the unscrambling and aligning conveyor. Placement of the unscrambling and aligning conveyor upstream of the induction system assures proper orientation of the articles during the induction process, and thereby increases the efficiency or throughput of the conveyor operation.

The present invention facilitates a high volume unscrambling and aligning of articles because of its effective means for providing gaps between the articles and conveying the articles laterally toward the alignment region. As it is driven by one power mechanism, the unscrambling and aligning conveyor of the present invention provides a low cost and effective conveyor for singulating articles which requires less maintenance than existing unscrambling and aligning conveyors.

Furthermore, the present invention provides an effective method for retrofitting an existing unscrambling and aligning conveyor or transforming a length of conveyor into a unscrambling and aligning conveyor by removing the existing article transporting surface and replacing it with the tapered rollers of present invention. This method permits existing conveyor systems to achieve greater throughput at a reduced cost.

These and other objects, advantages and features of the present invention will become apparent upon review of the following specification in conjunction with the drawings.

BRIEF DESCRIPTION OF THE DRAWINGS

FIG. 1a is a plan view of a conveyor system according to the present invention;

DESCRIPTION OF THE PREFERRED EMBODIMENTS

Figure 1:
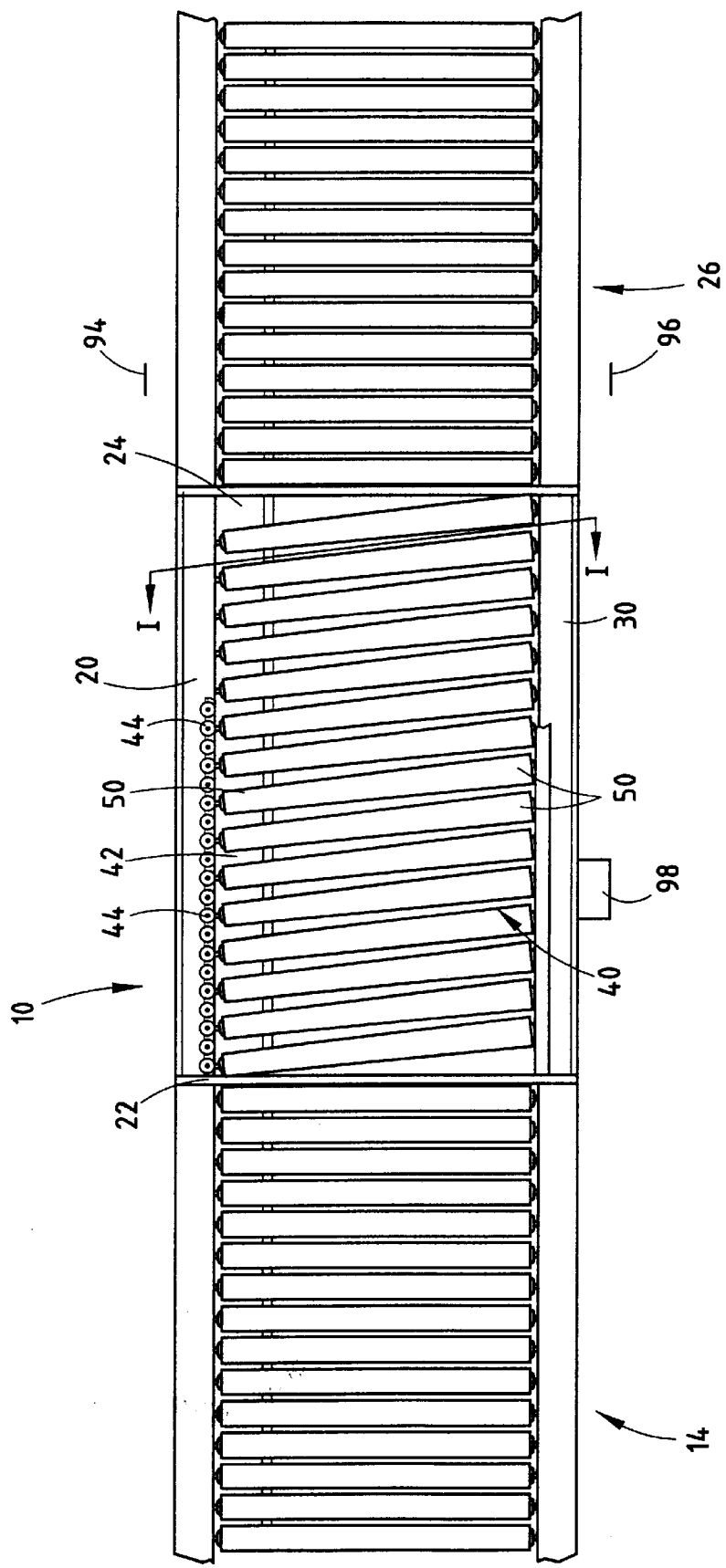
FIG. 1 is a plan view of an unscrambling and aligning conveyor according to the present invention.

Referring now specifically to the drawings, and the illustrative embodiments depicted therein, an unscrambling and aligning conveyor 10 includes a vertical first side support 20 and an opposing vertical second side support 30. First side support 20 and second side support 30 are parallel and placed a preselected distance apart. An article transport surface 40 is attached to and supported by first side support 20 and second side support 30. The articles or packages to be separated from a laterally adjacent position to single file on unscrambling and aligning conveyor 10 are delivered to input end 22 of unscrambling and aligning conveyor 10 from an input conveyor 14. The articles delivered to unscrambling and aligning conveyor 10 by input conveyor 14 are randomly arranged and of varying dimension and may be laterally adjacent. As the articles contact input end 22 of unscrambling and aligning conveyor 10, they are accelerated and moved laterally across article transport surface 40 of the unscrambling and aligning conveyor 10, and aligned in single file in alignment region 42 of article transport surface 40. Alignment region 42 is proximate to first side support 20. Articles positioned in alignment region 42 of article transport surface 40 are positioned against or immediately adjacent a vertical guide surface 44 which, in the illustrated embodiment, is plurality of guide rollers positioned adjacent to and above article transport surface 40. Vertical guide surface 44 could, alternatively, be a vertical belt, a series of vertically arranged travelling belts or a stationary surface. Guide surface 44 forms an upstanding vertical alignment surface to allow articles to align against in alignment region 42 of article transport surface 40. The articles that get arranged in single file along unscrambling and aligning conveyor 10 are discharged therefrom at discharge end 24 to an accumulation conveyor 26 and are transported downstream for further processing.

As shown in FIG. 1a, accumulation conveyor 26 transports articles to an induction system 100. In normal conveyor operations, there is usually more than one conveyor line 110 conveying articles to induction system 100. Consequently, FIG. 1a illustrates two conveyor lines 110, each of which presents articles to the induction system 100. Each conveyor line 100 includes an input conveyor 14, an unscrambling and aligning conveyor 10 and an accumulation conveyor 26. Induction system 100 includes induction conveyors 112, each of which receives articles from the respective accumulation conveyor 26 and forwards the same to a combiner 114. Induction conveyors 112 controllably release articles to combiner 114 so as to provide a gap between each successive article positioned on combiner 114. Induction system 100 may be of the type disclosed in commonly assigned U.S. Pat. Nos. 5,038,911; 5,341,916; and 5,267,638, the disclosures of which are hereby incorporated herein by reference. Once articles are inducted by induction system 100, further processing includes scanning of the barcode contained on each article and the subsequent sortation of these articles by a sortation conveyor which forwards the articles to a particular destination area.

Figure 2:
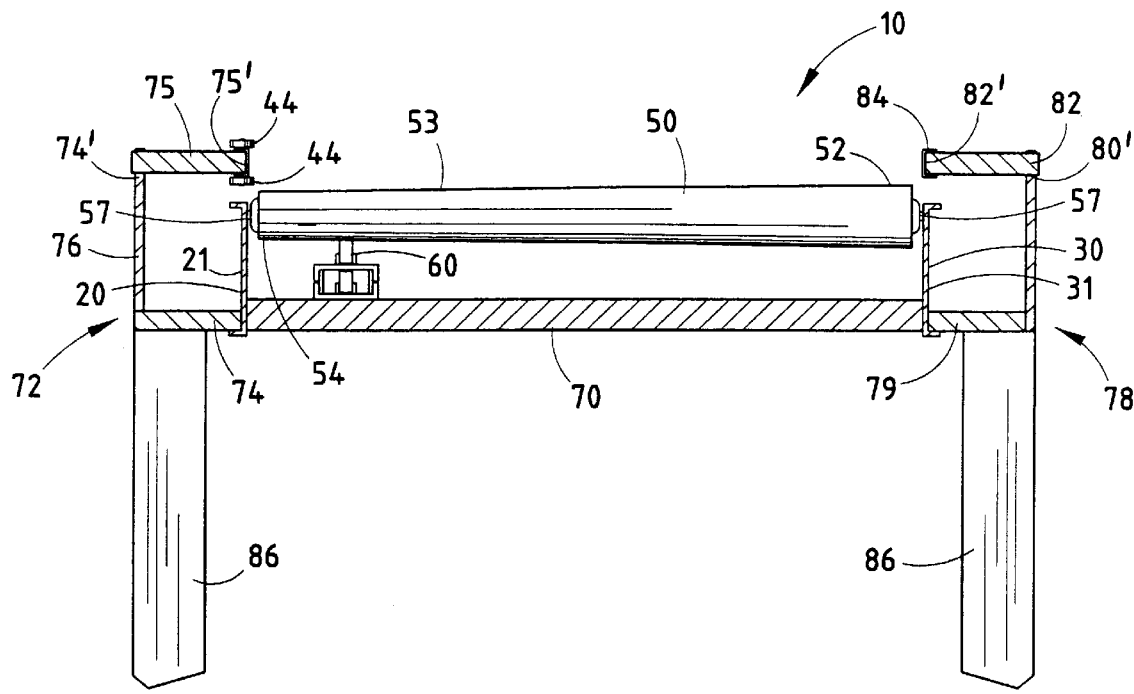
FIG. 2 is a sectional view taken along line I—I of FIG. 1.

Article transport surface 40 is comprised of a plurality of tapered rollers 50. Each tapered roller 50 is generally parallel to the adjacent tapered roller 50 and may be skewed or canted to side support 20 and side support 30 at a preselected angle. The skew or cant angle of each roller 50 is such that the axis of each tapered roller 50 converges toward side support 20. As shown most clearly in FIG. 2, each tapered roller 50 is formed having a tapered surface with a maximum diameter end 52 positioned adjacent side support 30 and a minimum diameter end 54 positioned adjacent side support 20.

Figure 3:
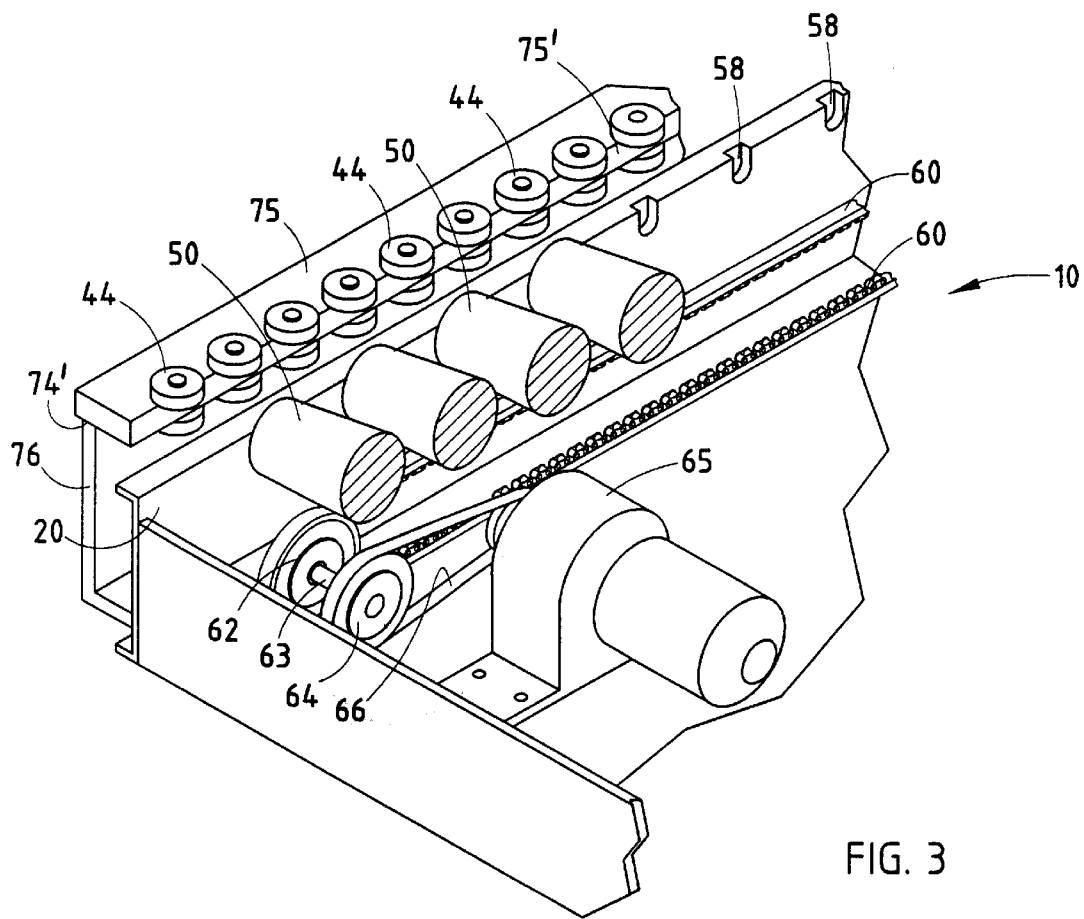
FIG. 3 is a fragmentary perspective view of the power mechanism of the unscrambling and aligning conveyor of FIGS. 1 and 2.

In the preferred construction, each tapered roller 50 is an axleless roller. Tapered rollers 50 are rotatably attached to side supports 20, 30 by axle adapters 57. However, tapered rollers 50 could be supported by a central shaft, or by a pair of shaft sections, one at each end, aligned along the same axis as the axle adapters 57. In either construction, the ends of the shaft projecting from each tapered roller 50 are received by apertures 58 formed in side support 20 and side support 30 (FIG. 3). In the illustrated embodiment, axle adapters 57 are positioned within apertures 58 such that the centerline of each tapered roller 50 is horizontal. Consequently, top surface 53 of each tapered roller 50 slopes downwardly or declines from side support 30 to side support 20. As a result, article transport surface 40 slopes downwardly towards alignment region 42. This downwardly sloping article transport surface 42 results in a slight gravitational force being imparted upon articles positioned on article transport surface 42 to thereby move the same into alignment region 42. Alternatively, top surface 53 of each tapered roller 50 could be set substantially horizontal such that the skew of the rollers alone urge articles toward alignment region 42.

Each tapered roller 50 is independently driven by endless driving member 60. Driving member 60 is trained around a gear 62 having a shaft 63 operably connected to a gear 64. Gear 64 is operationally connected to a power mechanism or motor 65 by endless belt 66. Motor 65 drives each tapered roller 50 at a single, preselected speed.

In the illustrated embodiment, driving member 60 is a padded chain of the type disclosed in commonly assigned U.S. Pat. No. 4,074,805, the disclosure of which is hereby incorporated herein by reference, but could also be a flat belt, a circular belt, a linked belt of the type disclosed in commonly assigned copending application, Ser. No. 60/115, 146, filed Jan. 8, 1999 by Nguyen et al., the disclosure of which is hereby incorporated herein by reference. Endless driving member 60 could, alternatively, be a belt of the type disclosed in commonly assigned U.S. Pat. No. 5,415,281, the disclosure of which is hereby incorporated herein by reference, which drives rollers 50 through intermediate pulleys and O-rings.

Side support 20 and 30 may be joined at suitable lengths by one or more cross supports 70. An L-shaped bracket 72 is attached to exterior surface 21 of side support 20. L-shape bracket 72 has a horizontal member 74 and a vertical member 76 extending upwardly from horizontal member 74. Attached to end 74' horizontal member 74 is a horizontal flange 75 extending in a direction towards article transport surface 40 and positioned thereabove. End 75' of horizontal flange 75 contains an aperture through which the shaft of rollers 44 extends. Exterior surface 31 of side support 30 carries an L-shaped bracket 78 having a horizontal member 79 and a vertical member 80 extending upwardly from horizontal member 79. Attached to end 80' of vertical member 80 is a flange 82 extending in a direction towards article transport surface 42. Abutment member 84 is attached to end 82' of flange 82. Abutment member 84 is generally "C" shaped and is preferably made of a material having a low coefficient of friction. Abutment member 84 and flange 82 provide a barrier preventing articles from being propelled laterally off tapered rollers 50 while the low coefficient of friction abutment member 84 enables articles to continue their forward progression along unscrambling and aligning conveyor 10. Attached to and depending from horizontal member 74 and 79 are legs 86. Legs 86 support unscrambling and aligning conveyor 10 a preselected distance above the floor.

As articles enter unscrambling and alignment conveyor 10 at input end 22, the skewed, tapered rollers 50 urge articles toward alignment region 42 of article transport surface 40. As is illustrated in FIG. 1, alignment region 42 is along the region of tapered rollers 50 having the minimum diameter 54. Further, the downwardly sloping angle of article transport surface 40 achieved by securing tapered rollers 50 to side supports 20 and 30 such that the centerline of each tapered roller 50 is horizontal, also contributes to the movement of articles toward alignment region 42. If tapered rollers 50 are not skewed, then the downwardly sloping angle of article transport surface 40 will urge articles toward alignment region 42.

As earlier described, each tapered roller 50 has a maximum diameter end 52 and an opposing minimum diameter end 54. The minimum diameter end 54 of tapered rollers 50 is positioned against side support 20 and defines alignment region 42 of article transport surface 40. As articles move longitudinally across tapered rollers 50, articles positioned proximate to side support 30 will move at a speed greater than articles positioned proximate to side support 20. This is so because the maximum diameter end 52 of each tapered roller 50 has a greater surface speed than the minimum diameter end 54. As a result, articles moving transversely from input end 22 to discharge end 24 of unscrambling and aligning conveyor 10 will experience a linear, lateral speed decrease across article transport surface 42 from side support 30 to side support 20 with alignment region 42 exhibiting the slowest speed. This linear, lateral speed decrease enables unscrambling and aligning conveyor 10 to singulate articles in alignment region 42.

Figure 4:
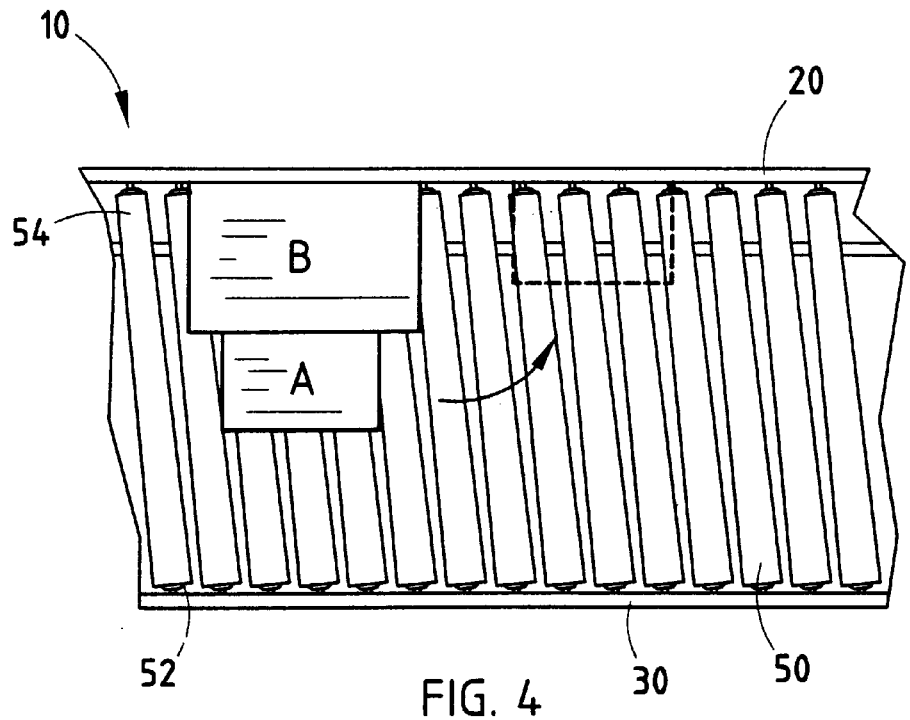
FIG. 4 is a schematic plan view of the unscrambling and aligning conveyor illustrating the alignment and singulation of articles therealong.

As depicted in FIG. 4, an article A laterally remote from alignment region 42 will travel at a faster speed and thereby move ahead of article B which is positioned proximate to or in alignment region 42. Thus, article A that is laterally farthest from the alignment region 42 will be accelerated in front of an article B laterally adjacent thereto. This lateral speed decrease rapidly reorganizes laterally adjacent articles into a single file stream in alignment region 42.

Figure 5:
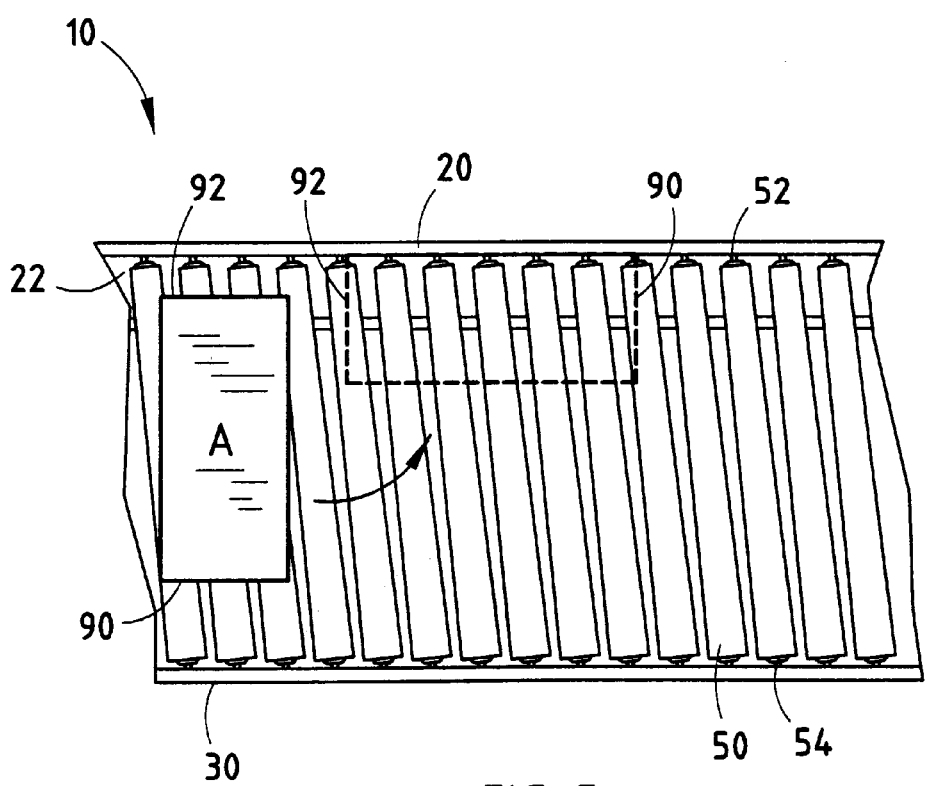
FIG. 5 is a schematic plan view of the unscrambling and aligning conveyor illustrating the rotation and alignment of an article therealong.

As shown in FIG. 5, the linear, lateral speed decrease across article transport surface 42 also results in the rotational movement of articles in alignment region 42 such that their major dimension is substantially parallel to side support 20. This beneficial rotation of articles, which facilitates their subsequent induction and sortation, occurs when a particular article is oriented at input end 22 such that its major dimension is substantially perpendicular to side supports 20, 30. For example, article A of FIG. 5 is rectangular with its major dimension being substantial perpendicular to cross supports 20 and 30. As article A moves along article transport surface 40, the different surface speeds imparted by tapered rollers 50 will result in end 90 of article A moving at a faster rate than end 92. This speed differential between ends 90, 92 of article A will tend to cause the rotation of the article A such that end 90 will move transversely along article transport surface 40 and rotate ahead of end 92 towards alignment region 42 such that when in the alignment region 42, the major dimension of article A will generally parallel to side supports 20 and 30. This rotation of packages is particularly beneficial when unscrambling and aligning conveyor 10 is used in the separation and organization in single file of a large number of articles of differing shapes and weights.

Unscrambling of articles within alignment region 42 of unscrambling and aligning conveyor 10 is further enhanced by providing a gap, or separation distance, between articles such that a laterally adjacent article may move into the space provided between the trailing end of a lead article and the forward end of a rear article. In the illustrated embodiment, this gap is achieved by creating a speed differential between end 15 of input conveyor 14 and input end 22 of unscrambling and aligning conveyor 10. Specifically, unscrambling and aligning conveyor 10 is run at a speed greater than input conveyor 14. In a preferred embodiment, unscrambling and aligning conveyor 10 is run at a speed of 270 feet per minute and input conveyor 14 is run at a speed of 180 feet per minute.

Figure 6:
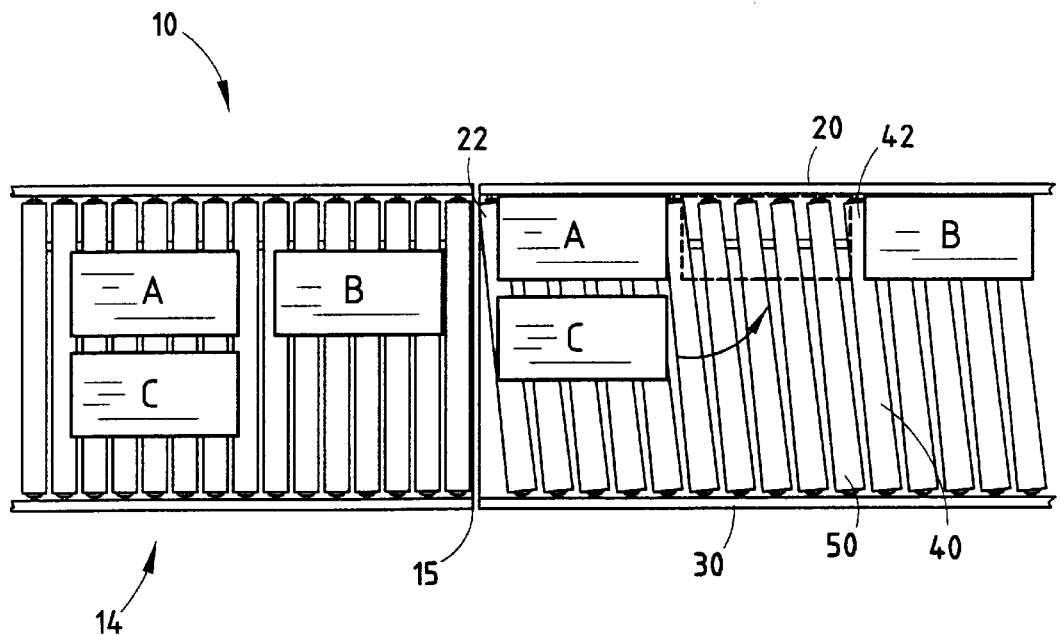
FIG. 6 is a schematic plan view of the unscrambling and aligning conveyor illustrating the gapping and aligning principal of the present invention.

As articles are conveyed from input conveyor 14 to unscrambling and aligning conveyor 10, articles contacting input end 22 of unscrambling and aligning conveyor 10 will be accelerated to thereby create a space, or gap, between it and the article behind it. As illustrated in FIG. 6, once article B traverses the intersection between input conveyor 14 and input end 22 of unscrambling and aligning conveyor 10, it is accelerated to thereby create a gap between it and the article A positioned therebehind. An article C, laterally adjacent to article A, and positioned proximate to side support 30 will be accelerated ahead of article A. As article C accelerates ahead of article A, the gap generated between article A and article B enables article C to singulated therebetween.

Under certain operating conditions, accumulation conveyor 26 may be in the accumulation mode, with articles accumulated at or near end 27 of accumulation conveyor 26. It is disadvantageous to have articles backed up or being accumulated on article transport surface 40. In order to prevent such accumulation on the unscrambling and aligning conveyor 10, a pair of photo-detectors 94 and 96 are positioned approximate to end 27 of accumulation conveyor 26 (FIG. 1). Photo-detectors 94 and 96 are in electrical communication with a controller 98 which is in turn operably connected to motor 65 of unscrambling and aligning conveyor 10. When photo-detectors 94 and 96 detect the presence of accumulated and articles at or near end 27 of accumulation conveyor 26 that have become stationary, a signal is sent to controller 98 to thereby shutdown or deactuate motor 65. Alternatively, controller 98 may issue a signal to motor 65 to thereby decrease the speed at which the unscrambling and aligning conveyor 10 is operated. Also, preferably, controller 98 is operationally connected with the power mechanism of input conveyor 14. Thus when articles have accumulated approximate to discharge end 24, a signal is sent which deactivates both unscrambling and aligning conveyor 10 and input conveyor 14. It will be understood by those with ordinary skill in the art that input conveyor 14 may be a series of different conveyor sections, all of which may be controlled by controller 98 to be deactivated, or operated at a reduced speed, upon receipt of a signal from controller 98.

Figure 7:
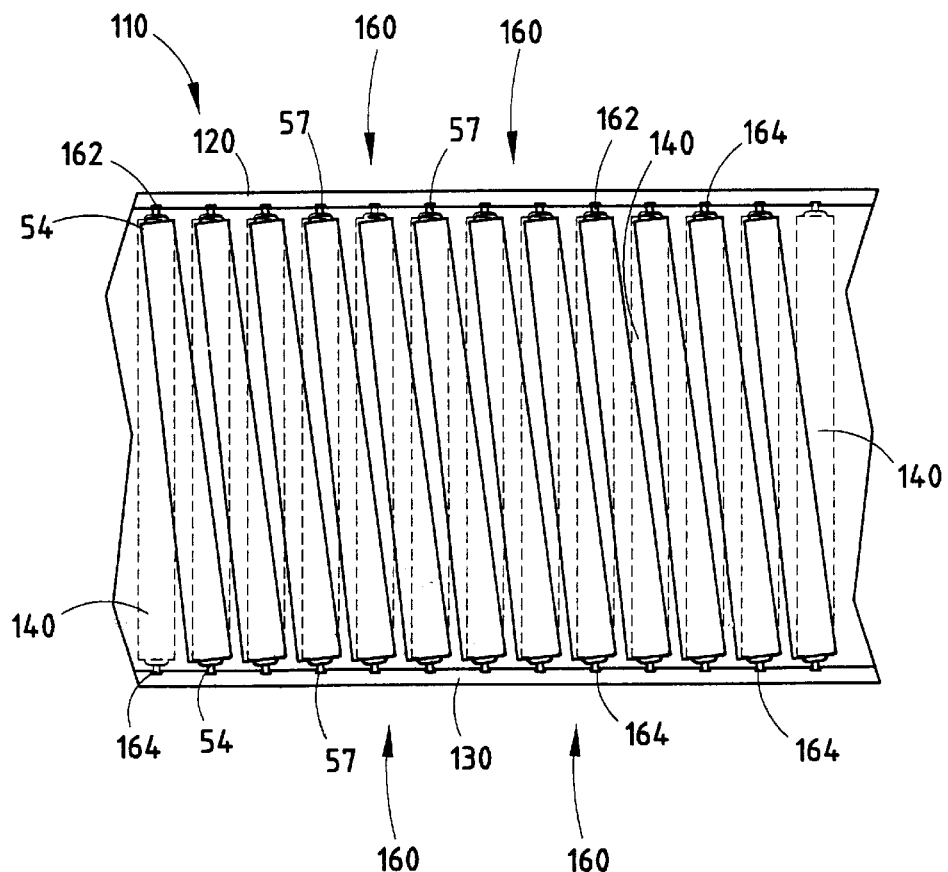
FIG. 7 is a plan view of a method of retrofitting a conveyor with the article transport surface of the unscrambling and aligning, conveyor according to the present invention, with the rollers of the existing conveyor depicted in phantom.

Unscrambling and aligning conveyor 10 may be retrofitted onto an existing conveyor 110 having generally parallel, side supports 120 and 130. Conveyor 110 may be an existing live roller conveyor. In order to retrofit an existing conveyor 110 with article transport surface 40 of unscrambling and aligning conveyor 10, it is first necessary to remove existing rollers 140 from side supports 120 and 130. As shown in FIG. 7, existing rollers 140 are depicted in phantom. Side supports 120 and 130 have a plurality of sets of apertures 160 placed a preselected distance apart. Each set of apertures 160 includes an aperture 162 positioned in side support 120 which is axially aligned with an aperture 164 positioned in support 130. Once existing rollers 140 are removed, tapered rollers 50 are positioned in sets of apertures 160. If it is desired to provide a skewed or canted article transport surface with respect to side supports 120 and 130, each tapered roller 50 is positioned in apertures which are axially offset. Specifically, this is achieved by positioning axle adapter 57, extending from minimum diameter end 54, into an aperture 162. Thereafter, axle adapter 57, extending from maximum diameter end 52, is inserted in an aperture 164 of an adjacently forward set of apertures 160. In order to provide tapered rollers 50 with a speed that is higher than the speed of input conveyor 14, thereby creating gaps at the input of conveyor 110, the power mechanism and drive system of existing conveyor 110 may be modified to thereby enable article transport surface 40 to be driven at a speed greater than the conveyor positioned upstream thereof. Modification of the power mechanism and drive system is a routine task within the knowledge of those of ordinary skill in the industry.

Many scanning and sorter conveyors located downstream of accumulation conveyor 26 are incapable of operating efficiently at speeds commensurate with the speed at which unscrambling and aligning conveyor 10 may be operated. Accumulation conveyor 26 is therefore operated at a speed less than the speed of unscrambling and aligning conveyor 10. Thus, articles singulated along alignment region 42 of unscrambling and aligning conveyor 10 will enter accumulation conveyor 26 and decelerate to a speed at which scanning and subsequent sortation may be achieved with minimum error. In a preferred embodiment, accumulation conveyor 26 is driven at a speed of approximately 135 feet per minute.

The above description is considered that of the preferred embodiments only. Modifications of the invention will occur to those skilled in the art and those who make or use the invention. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are defined as follows:

1. An unscrambling and aligning conveyor comprising:
   a first side support;
   a second side support;
   an input end to which articles are delivered in random order and alignment;
   a discharge end from which unscrambled, aligned articles are discharged; and
   an article transport surface supported by said first side support and said second side support, said article transport surface having an alignment region adjacent said first side support, said article transport surface configured to transport articles longitudinally from said input end to said discharge end, said article transport surface configured to produce a linear speed decrease laterally toward said alignment region such that articles positioned proximate to said second side support will move ahead of laterally adjacent articles positioned proximate to said first side support; and
   a vertical guide surface positioned adjacent said first side support, said vertical guide surface guiding articles being propelled against said vertical guide surface; and
   a means for reducing a length of the alignment region comprising substantially horizontally positioned roller centerlines.

2. The conveyor as recited in claim 1, wherein substantially the entire length of said article transport surface is driven at a constant speed.

3. The conveyer as recited in claim 1, wherein said article transport surface is tapered.

4. The conveyor as recited in claim 1, wherein said vertical guide surface is a plurality of guide rollers positioned adjacent said first support and above said article transport surface, each guide roller of said plurality of guide rollers rotating about a vertical axis.

5. The conveyor as recited in claim 1, wherein said article transport surface is sloped.

6. The conveyor as recited in claim 5, wherein said article transport surface is downwardly sloped toward said alignment region.

7. The conveyor as recited in claim 1, wherein said article transport surface further comprises a plurality of parallel rollers mounted to said first side support and said second side support, wherein the central axis of each roller of said plurality of rollers is skewed to said first side support and said second side support.

8. The conveyor as recited in claim 7, wherein each roller of said plurality of rollers is tapered.

9. The conveyor as recited in claim 8, wherein each roller of said plurality of rollers has a first end attached to said first side support and a second end attached to said second side support, wherein the diameter of each roller of said plurality of rollers decreases from said second end to said first end.

10. An unscrambling and aligning conveyor comprising:
    a first side support;
    a second side support;
    an input end to which articles are delivered;
    a discharge end from which unscrambled, aligned articles are discharged;
    a plurality of rollers supported by said first side support and said second side support, said plurality of rollers defining an alignment region positioned proximate to said first side support, said plurality of rollers transporting articles longitudinally from said input end to said discharge end and laterally toward said alignment region, said plurality of rollers configured to produce a lateral speed decrease toward said alignment region; and
    a vertical guide surface positioned adjacent said first side support, said vertical guide surface guiding articles being propelled against said vertical guide surface; and
    a means for reducing a length of the alignment region comprising said plurality of rollers having substantially horizontally positioned centerlines; and
    a power mechanism operationally connected to said plurality of rollers, said power mechanism configured to rotate said plurality of rollers at a preselected speed.

11. The conveyor as recited in claim 10, wherein said plurality of rollers are parallel.

12. The conveyor as recited in claim 10, wherein said plurality of rollers are skewed relative to said first side support and said second side support.

13. The conveyor as recited in claim 10, wherein said plurality of rollers are sloped in a downward direction toward said alignment region.

14. The conveyor as recited in claim 10, wherein each roller of said plurality of rollers is tapered.

15. The conveyor as recited in claim 10, wherein each roller of said plurality of rollers has a first end attached to said first side support and a second end attached to said second side support, wherein the diameter of each roller of said plurality of rollers decreases from said second end to said first end.

16. The conveyor as recited in claim 10, wherein each roller of said plurality of rollers has a maximum diameter and a minimum diameter, wherein said minimum diameter of each roller of said plurality of rollers is positioned within said alignment region.

17. The conveyor as recited in claim 12, wherein said vertical barrier is a plurality of guide rollers positioned adjacent said first support and above said plurality of rollers, each guide roller of said plurality of guide rollers rotating about a vertical axis.

18. A conveyor system comprising:
    an input conveyor providing scrambled, randomly aligned articles; and
    an unscrambling and aligning conveyor having an input end positioned adjacent said input conveyor and a discharge at a lateral side of said unscrambling and aligning conveyor end from which unscrambled, aligned articles are discharged, said input end receiving articles from said input conveyor, wherein said input conveyor and said unscrambling and aligning conveyor are configured to produce a gap between longitudinally adjacent articles at said input end; and a vertical guide surface positioned adjacent said lateral side, said vertical guide surface guiding articles being propelled against said vertical guide surface; and a means for reducing a length of the unscrambling and aligning conveyor comprising a plurality of tapered rollers having substantially horizontally positioned centerlines and a narrower diameter towards the lateral side.

19. The conveyor system as recited in claim 18, wherein said unscrambling and aligning conveyor further comprises:

a first side support;

a second side support; and an article transport surface supported by said first side support and said second side support, said article transport surface having an alignment region adjacent said first side support, said article transport surface configured to transport articles longitudinally from said input end to said discharge end, said article transport surface configured to produce a linear speed decrease laterally toward said alignment region such that articles positioned proximate to said second side support will move ahead of laterally adjacent articles positioned proximate to said first side support.

20. The conveyor system as recited in claim 18, wherein said unscrambling and aligning conveyor is driven at a first speed, wherein said input conveyor is driven at a second speed, wherein said first speed is greater than said second speed to thereby create said space between longitudinally adjacent articles entering said input end of said unscrambling and aligning conveyor.

21. The conveyor system as recited in claim 18, further comprising an accumulation conveyor positioned adjacent to said discharge end of said unscrambling and aligning conveyor.

22. The conveyor system as recited in claim 21, wherein said unscrambling and aligning conveyor is driven a first speed, wherein said accumulation conveyor is driven at a second speed, and wherein said first speed is greater than said second speed.

23. The conveyor system as recited in claim 21, wherein said accumulation conveyor has an intake end positioned proximate to said discharge end of said unscrambling and aligning conveyor, and wherein said conveyor system further comprises at least one sensor positioned along said accumulation conveyor, said at least one sensor sensing the accumulation of articles along said accumulation conveyor, wherein said at least one sensor sends a signal for reducing the speed of said unscrambling and aligning conveyor upon sensing a predetermined amount of accumulation of articles along said accumulation conveyor.

24. The conveyor system as recited in claim 23, further comprising:

a power mechanism, said power mechanism configured to drive said article transport surface of said unscrambling and aligning conveyor at a preselected speed;

a controller in electrical communication with said power mechanism, said at least one sensor being in electrical communication with said controller, said at least one sensor issuing a signal to said controller when said at least one sensor senses said predetermined amount of accumulation of articles along said accumulation conveyor.

25. The conveyor system as recited in claim 24, wherein said controller deactivates said unscrambling and aligning conveyor in response to said signal issued by said at least one sensor.

26. The conveyor system as recited in claim 24, wherein said input conveyor is driven by an input conveyor power mechanism, wherein said controller is in electrical communication with said input conveyor power mechanism, wherein said controller deactivates said unscrambling and alignment conveyor and said input conveyor in response to said signal issued from said at least one sensor.

27. The conveyor system as recited in claim 18, wherein said article transport surface is sloped.

28. The conveyor system as recited in claim 27, wherein said article transport surface is downwardly sloped toward said alignment region.

29. The conveyor system as recited in claim 18, wherein said article transport surface further comprises a plurality of parallel rollers mounted to said first side support and said second side support, wherein the central axis of each roller of said plurality of rollers is skewed to said first side support and said second side support.

30. The conveyor system as recited in claim 21, wherein each roller of said plurality of rollers is tapered.

31. The conveyor system as recited in claim 30, wherein each roller of said plurality of rollers has a first end attached to said first side support and a second end attached to said second side support, wherein the diameter of each roller of said plurality of rollers decreases from said second end to said first end.

* * * * *

UNITED STATES PATENT AND TRADEMARK OFFICE
CERTIFICATE OF CORRECTION

PATENT NO.    : 6,253,905 B1
DATED         : July 3, 2001
INVENTOR(S)   : Ronald E. Pelka It is certified that error appears in the above-identified patent and that said Letters Patent is hereby corrected as shown below:

<u>Column 9,</u>
Line 50, "conveyer" should be -- conveyor --

<u>Column 10,</u>
Line 65, delete "at a lateral side of said unscrambling and aligning conveyor"
Line 67, insert -- at a lateral side of said unscrambling and aligning conveyor -- after "discharged,"

Signed and Sealed this

Twenty-seventh Day of May, 2003

JAMES E. ROGAN
*Director of the United States Patent and Trademark Office*